United States Patent Office 3,342,733
Patented Sept. 19, 1967

3,342,733
PREPARATION OF COLLOIDAL CARBONATES IN HYDROCARBON MEDIA
Max L. Robbins, South Orange, and Max W. Hill, Westfield, N.J., assignors to Esso Research and Engineering Company, a corporation of Delaware
No Drawing. Filed Oct. 5, 1964, Ser. No. 401,645
7 Claims. (Cl. 252—33)

This application is a continuation-in-part of application Ser. No. 67,170, filed November 4, 1960, and abandoned subsequent to the filing of the present application.

This invention concerns the preparation of colloidal dispersions of alkaline earth metal carbonates in hydrocarbon oils including lubricating oils, fuel oils, motor fuels, and the like. The dispersions are useful as combination detergent and inhibitor additives and are particularly useful in internal combustion engine lubricants.

It has long been recognized that colloidal dispersions of metal carbonates such as calcium carbonate and barium carbonate in liquid hydrocarbon media have very desirable properties. Such dispersions are of considerable importance in that they impart basicity to the oil, thus promoting rust inhibition, corrosion inhibition, and engine cleanliness. Basicity has in the past been obtained by employing the so-called basic soaps or "overbased" salts of various organic acidic materials such as metal alkyl phenates, metal salts of alkyl phenol sulfides (i.e. thioethers of alkyl phenols), metal salts of organic sulfonic acids, and the like. One method for the preparation of such basic soaps or salts involves the mere use of an excess of neutralizing agent in the form of an oxide, hydroxide or carbonate of the desired metal. This produces a material which contains an amount of metal in excess of the amount that is theoretically required to replace the acidic hydrogen of the organic acid that has been employed as the starting material. Related additives that have the advantage of basic salts are metal complexes or colloidal dispersions of inorganic salts or of metal oxides or hydroxides wherein there is a high ratio of metal to organic acid component.

Workers in the art of lubricant additives have proposed the preparation of detergent dispersants or combined detergent inhibitor additives by reacting alkaline earth metal oxides and/or hydroxides with carbon dioxide in the presence of promoters and dispersants such as alkyl phenols and phosphosulfurized hydrocarbons. In previous work it was found that in order to increase the metal content of the system it was necessary to increase the amount of dispersant also. Inasmuch as the dispersant represents a considerable item in the overall cost of the additive composition, there has been an incentive to develop methods for attaining high ratios of metal to dispersant in stable compositions of this type. The advantage gained in replacing relatively expensive basic soaps with relatively inexpensive inorganic salts is readily evident.

The presently used methods of preparing alkaline earth metal carbonate dispersions such as those outlined above are relatively complex and require close control of conditions. Simple direct dispersion of an alkaline earth metal carbonate in a hydrocarbon oil medium would be highly desirable if an acceptable colloidal dispersion could thereby be obtained, but attainment of the objective of producing a satisfactorily high concentration of the carbonate in the form of a clear stable colloidal dispersion, free from the formation of observable sediment, by such a direct dispersion step has not been possible. The principal problem has been to obtain the alkaline earth metal carbonate in colloidal form.

From an economic standpoint, the most desirable process for the preparation of an alkaline earth metal carbonate suitable for dispersion in a hydrocarbon oil would be one involving a simple reaction in an aqueous medium. Previous workers have attempted to obtain colloidal size particles of calcium carbonate or barium carbonate or other alkaline earth metal carbonates by a simple doubledecomposition reaction in aqueous media but have been unable to prevent agglomeration and particle growth before the carbonate could be transferred to the hydrocarbon oil medium. To obviate this, it has been proposed to conduct the double-decomposition reaction in the presence of the oil medium by dispersing an aqueous solution of one reactant, e.g. sodium carbonate, in the oil medium containing a dispersant and then adding an aqueous solution of the second reactant, e.g. calcium chloride. The theory involved in this procedure is that the resulting colloidal particles of alkaline earth metal carbonate are protected from agglomeration by the dispersant that is present in the oil. While such a process does appear to be fairly simple, a difficulty can arise in removing the water-soluble by-product of the reaction, e.g. sodium chloride. Since one of the reacting salts is first intimately mixed with the oil phase before the double-decomposition reaction occurs, an appreciable portion of the water-soluble by-product such as sodium chloride tends to be intimately mixed with the oil phase also, and its complete removal often presents a problem, the solution of which requires special washing steps, close control of conditions, and the like.

In accordance with the present invention it has been found that stable transparent colloidal sols embodying high ratios of alkaline earth metal carbonates to dispersant in hydrocarbon oils can be prepared by first forming a colloidal gel of the desired carbonate in an aqueous medium by reacting a concentrated aqueous solution of an inorganic acid salt of an alkaline earth metal with a concentrated aqueous solution of ammonium carbonate or of an alkali metal carbonate, and immediately thereafter mixing the resulting gel with a body of a hydrocarbon oil under conditions of mild agitation, the hydrocarbon oil containing an oil-dispersible surfactant. The process provides advantages in reducing processing time and processing steps, minimizing control problems and facilitating recovery of the desired product.

To prepare the metal carbonate gel, a concentrated solution of a water-soluble salt, usually the chloride or nitrate, of an alkaline earth metal, e.g. barium chloride, calcium chloride, strontium nitrate, magnesium chloride, or the like, is mixed with a concentrated aqueous solution of ammonium carbonate or of an alkali metal carbonate, e.g. sodium carbonate or potassium carbonate. Each of the reacting solutions must contain at least a 20 weight percent concentration of the reactant, in order that gel formation will occur. Each solution should be at least 75% saturated and more desirably at least 90% saturated. Essentially complete saturation or supersaturation of the reacting solutions is especially preferred. The resulting double-decomposition reaction yields a water-insoluble alkaline earth metal carbonate in the form of a gel. Such a gel is not stable, however, because particle growth and aggregation begin rapidly and cause the gel to lose transparency within a very short time, i.e. 5 minutes or so.

It is thus an important aspect of the present invention that the gel of alkaline earth metal carbonate that is formed is immediately, that is, within not more than 2 minutes, mixed with a hydrocarbon oil containing an oil-dispersible surfactant or dispersant. The resulting system must be such that an emulsion is formed when the components are thoroughly mixed.

In some instances the oil-dispersible surfactant may inherently have the proper hydrophilic-lipophilic balance to give the desired emulsion. In other instances auxiliary emulsifiers or polar materials may be necessary to give the proper balance. The surfactant-dispersant system must be one that will give an oil-continuous emulsion and the emulsion must be what is known as a "tight" emulsion, i.e. one having a droplet size of the order of less than 10 microns and preferably of 1 micron or less.

To attain the proper balance between hydrophilic and lipophilic forces in the system of surfactants and dispersants, it is convenient to use the scale of HLB values (hydrophilic-lipophilic balance) given in the brochure entitled "The Atlas HLB System" published by Atlas Chemical Industries Incorporated (1962). Generally, HLB values between 5 and 15 and more commonly between 8 and 12 will be correct for the preparation of a satisfactory oil-continuous emulsion for the present invention. To assist in the attaining of a proper HLB value, it is sometimes helpful to employ an auxiliary dispersant material or polar emulsifier. This material may be incorporated in the aqueous medium in which the gel is formed, or it may be added to the oil phase. Suitable materials of this nature include gelatin, lignin sulfonates, low molecular weight polyols such as glycerol or ethylene glycol, low-molecular-weight polyamines such as ethylene diamine or diethylene triamine, low-molecular-weight alkanolamines, alkali metal salts of sulfonic acids derived from benzene, toluene or xylene, ethylene oxide condensates of various organic compounds, etc. The ethylene oxide condensates are preferably those having in the range of 5 to 15 ethylene oxide units per chain and include those derived from alkyl phenols (e.g. the Tritons) fatty acids, fatty amines, fatty alcohols and fatty esters (e.g. the Atlas Spans and Tweens). The amount of auxiliary dispersant material used may vary within wide limits, depending upon the particular system involved.

In the formation of the gel any temperature between 32 and 212° F. may be used. The gel is then immediately mixed with the oil containing the surfactant, using sufficient agitation to form an emulsion. Temperatures for this step are preferably in the range of 75 to 200° F. Preferably the oil is added to the gel. The emulsion is then broken, the two phases are separated, and any of the aqueous medium that remains in the oil phase is removed by heating. The breaking of the emulsion can be facilitated by gentle heating and/or by the addition of a lighter hydrocarbon such as hexane or heptane, which acts to reduce the viscosity and thus cause more rapid settling. Any solids that are not colloidally dispersed or that do not dissolve in the aqueous layer can be removed by filtration. Demulsification can also be aided by adjusting the HLB to a lower value.

The oil-dispersible surfactants or dispersants that may be used in this invention include metal aryl alkyl sulfonates, oil-soluble metal alkyl sulfates, hydrocarbon sulfonic acids, phosphosulfurized hydrocarbons, phosphate esters of high molecular weight alcohols such as those prepared by reaction of phosphorus pentoxide with the oxo alcohols, high molecular weight saturated and unsaturated fatty acids and their metal salts, e.g. calcium or barium stearates or oleates, alkaline earth metal naphthenates, high molecular weight oil-soluble amines, the condensation products of alkenyl succinic anhydrides and polyamines, the condensation products of alkylene succinic anhydrides, polyamines and carboxylic acids, and the reaction products of alkenyl succinic anhydrides with polyamines and polyhydric alcohols. The term "oil-dispersible" is intended to include truly oil-soluble materials as well as those that are not completely soluble in oil. The concentration of dispersant or surfactant in the hydrocarbon phase may vary within fairly wide limits, e.g. from about 10 to about 50 weight percent, but will generally be in the range of 20 to 35 weight percent.

Phosphosulfurized hydrocarbons are prepared by reacting a sulfide of phosphorus, for example $P_2S_5$, with a suitable hydrocarbon base stock, such as a terpene, a heavy petroleum fraction, distillate or residuum containing less than 5%, or aromatics, and having a viscosity at 210° F. of 140 to 250 SUS or a polyolefin, such as a polymer of ethylene, propylene, isobutylene, etc., having a Staudinger molecular weight in the range of 500 to 200,000 and containing 2 to 6 carbon atoms per olefin monomer. The polybutenes having Staudinger molecular weights in the range of 700 to 100,000 are particularly preferred. The phosphosulfurized hydrocarbon can be prepared by reacting the hydrocarbon base stock with from 5 to 30 weight percent of a sulfide of phosphorus, and preferably with from 10 to 20 weight percent of phosphorus pentasulfide. The preparation of phosphosulfurized hydrocarbons and the use of catalysts in the phosphosulfurization reaction are more fully described in U.S. Patent 2,875,188.

Hydrocarbon sulfonic acids and their salts are also well known in the art. The sulfonic acids can be obtained through the sulfonation of either synthetic or natural hydrocarbons. Suitable sulfonic acids are produced by sulfonating alkyl aromatic hydrocarbons such as didodecyl benzene. They can also be obtained by treatment of lubricating oil base stocks with concentrated or fuming sulfuric acid in a conventional manner to produce oil-soluble "mahogany" acids. The preferred sulfonic acids have molecular weights in the range of 300 to 700 (as the sodium soap). The synthetic acids preferably have a narrower molecular weight in the range of 400 to 600. The acids can contain more than one sulfonyl group in the molecule. Specific examples of sulfonates useful in this invention include barium di-$C_9$ alkyl benzene sulfonate in which the alkyl groups are obtained from tripropylene, calcium $C_{16}$ alkyl benzene sulfonate (from benzene alkylated with tetraisobutylene) and calcium petroleum sulfonate.

Mixed phosphate esters which may be used as surfactants in the practice of this invention may be prepared by reacting one mole of $P_2O_5$ with from 2 to 6 moles, and preferably 2 to 4 moles of a suitable alcohol to say from 6 to 16 atoms per molecule at temperatures of from 50 to 200° F. for from ¼ to 4 hours. Depending upon the reaction conditions and the particular alcohols used, the reaction products will vary in composition but will usually comprise chiefly a mixture of the orthophosphoric acid mono and di-esters of the alcohols, along with minor amounts of unreacted alcohols, orthophosphoric acid, and condensed polyphosphates. Suitable alcohols include the oxo alcohols, which are well known to the art, being prepared by reaction of olefins with carbon monoxide and hydrogen in the presence of a suitable catalyst to form aldehydes of one more carbon atom than the starting olefins, followed by catalytic hydrogenation to the corresponding alcohols.

High-molecular-weight amines that may be used include Primene 81R which is a mixture of tertiary alkyl primary amines ranging from 15 to 18 carbon atoms, and Armeen HT, technical octadecylamine, which contains about 70% octadecylamine and about 25% hexadecylamine.

Other dispersants that can be employed in this invention are products obtained by the reaction of polyamines with high molecular weight carboxylic acids or their anhydrides, the said carboxylic acids or anhydrides having in the range of from about 40 to about 250 carbon atoms.

One type of such nitrogen-containing dispersants comprises derivatives of alkenyl succinic anhydrides selected from the class consisting of the reaction products of alkenyl succinic anhydrides with polyamines (as described for example in Canadian Patent 666,916), the reaction products of alkenyl succinic anhydrides with polyamines and carboxylic acids, and the reaction products of alkenyl succinic anhydrides with polyhydric alcohols and polyamines. Another type of nitrogen-containing dispersant is derived by condensing, under amide-forming conditions, a polyamine with a high molecular weight monocarboxylic acid having a long aliphatic chain, the latter acid having been prepared by condensing a halogenated, high molecular weight, olefin polymer with an alpha, beta-unsaturated monocarboxylic acid.

The preparation of an alkenyl succinic anhydride is well known in the art and simply involves reacting maleic anhydride with an organic compound having an olefinic linkage. Generally, about equal molar proportions of maleic anhydride and the olefinic material are simply heated together. In some cases somewhat of an excess of olefinic material may be used; also in some instances catalysts may be employed in the reaction. Particularly desirable for use in the preparation of derivatives of polyamines and alkenyl succinic anhydrides are compounds of the latter type containing alkenyl groups obtained by reacting the maleic anhydride with a polymer of a $C_2$ to $C_5$ monoolefin wherein the polymer has a molecular weight within the range of from about 500 to about 3500. More specifically, the alkenyl group may be derived from polypropylene or polyisobutylene of about 700 to 1700 molecular weight.

The aliphatic polyamine which is employed in preparing the reaction products may include such polyalkylene polyamines as diethylene triamine, tetraethylene pentamine, octaethylene nonamine, and tetrapropylene pentamine, as well as N-aminoalkyl piperazines, mixtures of different alkylene polyamines, mixtures of different N-aminoalkyl piperazines, and mixtures of N-aminoalkyl piperazines with alkylene polyamines.

Related dispersants can be prepared by reaction of an alkenyl succinic anhydride with a polyamine and a carboxylic acid as disclosed and claimed in copending application Ser. No. 221,354 of Norman Tunkel, filed September 4, 1962, and in copending application Ser. No. 241,174 of Norman Tunkel et al. filed November 30, 1962 and now abandoned. The carboxylic acid employed is one having from 1 to 30 carbon atoms in an aliphatic hydrocarbon chain and is preferably a carboxylic acid having from 1 to 18 carbon atoms. The aliphatic chain may be either branched or straight chain and either saturated or unsaturated. The acids may be either monocarboxylic or dicarboxylic and include acetic, fumaric, adipic, lauric, oleic, linoleic, and stearic acids.

Still other related dispersants can be prepared by reacting an alkenyl succinic acid or anhydride with a polyhydric alcohol or an alkanolamine and subsequently with a polyamine in accordance with the procedure disclosed and claimed in application Ser. No. 221,447 filed September 5, 1962, for Vincent P. Catto and Norman Tunkel now U.S. Patent No. 3,184,474, patented May 18, 1964. In preparing these dispersant additives, the polyamines and the alkenyl succinic anhydrides are of the same nature as disclosed above. The polyhydric alcohols include alkylene glycols, such as ethylene glycol, propylene glycol, butanediol-1,4, pentanediol-1,5, octylene glycol, and polyalkylene glycols, such as polyethylene glycols and polypropylene glycols. The alkanolamines include triethanolamine and diethanolamine. Equimolar proportions of each of the three reactants are normally used, although the molar proportions may vary somewhat. In preparing the additive, the polyhydric alcohol or alkanolamine and the alkenyl succinic anhydride are refluxed together for from 1 to 24 hours, after which the polyamine is added and refluxing is continued for 1 to 24 hours, while removing water of condensation.

An additional type of dispersant can be prepared by condensing a halogenated, high molecular weight, olefin polymer with an alpha, beta-unsaturated monocarboxylic acid to form a high molecular weight acid having a long aliphatic chain and, subsequently, reacting the latter acid with a polyalkylene polyamine under conditions causing amide formation. Additives of this type are disclosed and claimed in copending application Ser. No. 337,187 of Roger E. Chandler, filed January 13, 1964.

To prepare the high molecular weight carboxylic acids, the preferred starting material is a polymer of a $C_2$ to $C_5$ monoolefin, e.g. polyethylene, polypropylene or polyisobutylene, wherein the olefin polymer has an average molecular weight within the range of from about 600 to about 3000. The polymer is halogenated and then condensed with an alpha, beta-unsaturated monocarboxylic acid of from 3 to 8 carbon atoms. Such acids include acrylic acid, alphamethylacrylic acid, crotonic acid, tiglic acid, angelic acid, sorbic acid, and cinnamic acid.

In condensing the halogenated polyolefin with the unsaturated acid, at least one mole of acid is used per mole of halogenated polyolefin. The temperature may be in the range of from about 300 to 500° F., and the condensation may require from about 3 to about 24 hours. The high molecular weight carboxylic acid thus obtained is further reacted with a polyalkylene polyamine, of the types previously described, e.g. tetraethylene pentamine, under conditions favoring amide formation, e.g. 200 to 400° F., or in most cases a narrower range of about 250° to about 350° F. Generally, the mole ratio of acid to polyamine will be in the range of 1:1 to about 5:1.

The following examples serve to illustrate this invention.

EXAMPLE 1

Separate solutions of 40 grams of $Na_2CO_3$ in 100 ml. of water and 42 grams of $CaCl_2$ and 20 grams of glycerol in 50 ml. of water were prepared. Both solutions were heated to 200° F. The $Na_3CO_3$ solution was added rapidly to the $CaCl_2$ solution with moderate stirring. A transparent aqueous gel of $CaCO_3$ formed. This step was immediately followed by the addition of 500 grams of a 10 weight percent solution of a calcium petroleum sulfonate (molecular weight about 920) in a neutral mineral oil having a viscosity at 100° F. of 150 SSU. The final temperature was 160° F. Large agglomerates of gelatinous precipitate formed which redispersed on continued stirring for 2 hours at 160° F. to form a deep yellow water-in-oil emulsion. The emulsion broke on standing to give a hazy orange oil and a clear pale yellow water phase. The water phase tested free of $CO_3$ ion. A small amount of thick tan cream collected at the water/oil interface. The water phase was separated, and the oil phase was then heated to 300° F. to drive off the remaining water. The oil filtered rapidly to give a crystal clear fluid orange sol containing 2.33% Ca. Calcium utilization was 68%. The ratio of calcium to sulfonate equivalents was 5.1.

EXAMPLE 2

A solution was prepared consisting of 42 grams of $CaCl_2$ and 50 grams of glycerol in 60 ml. of water. A solution of 40 grams of $Na_2CO_3$ in 125 ml. of water was added rapidly to the $CaCl_2$ solution at 75° F. without stirring. A transparent aqueous gel of $CaCO_3$ formed. Then 100 grams of a 45 weight percent solution of calcium petroleum sulfonte (molecular weight about 920) in mineral oil, heated to 250° F., was added immediately with stirring. A very thick creamy emulsion without solid aggregates formed rapidly. The emulsion was stirred slowly for 30 minutes and allowed to stand for 16 hours at 75° F. To break the emulsion, 200 ml. of heptane was then added. The water phase was separated and the oil phase was heated to 300° F. to drive off the heptane and remaining water. The oil filtered moderately rapidly to give a clear viscous orange sol containing 13.1% Ca. Calcium utilization was 88%. The ratio of calcium to sulfonate equivalents was 6.5.

EXAMPLE 3

To a mixture containing 55.5 grams of a 50 weight percent aqueous solution of $CaCl_2$ plus 10 grams of a 10 weight percent aqueous solution of gelatin there was added rapidly at 75° F. 105 grams of a 25 weight percent aqueous solution of $Na_2CO_3$. A clear hydrogel of $CaCO_3$ formed. To this was then added 100 grams of a solution consisting of 22.5 grams of calcium petroleum sulfonate of 920 molecular weight, 10 grams of $C_8$ oxo phosphates, and 67.5 grams of neutral mineral oil. The $C_8$ oxo phosphates were the reaction product of $P_2O_5$ and $C_8$ oxo alcohols and comprised approximately equal amounts of $C_8$ oxo alcohol, the monophosphate ester, and the di-ester. A typical analysis of $C_8$ oxo alcohols is given in U.S. Patent 2,746,924. The temperature of the oil solution was 75° F. A thick creamy water-in-oil emulsion formed within 10 seconds on light stirring. The emulsion was stirred lightly for 1 minute. It was then heated to 150° F. for 10 minutes. It returned to room temperature after standing for 20 minutes. After 150 cc. heptane was added, the emulsion broke on filtering by suction through Hy-flo filter aid. After separation from the aqueous phase, the hydrocarbon phase was heated to 300° F. and filtered through Hy-flo. The filtrate was a clear, somewhat viscous orange fluid containing 7.69% Ca. Utilization of calcium was 84%. The ratio of calcium to sulfonate equivalents was 7.5.

EXAMPLE 4

There is added 375 grams of a 53 weight percent aqueous solution of potassium carbonate (1.43 moles) to 1375 grams of a 24 weight percent aqueous solution of barium chloride (1.57 moles) at ambient temperature (75° F.), forming a translucent aqueous gel. To this gel there is immediately added a mixture consisting of 400 grams of an ashless dispersant concentrate, 40 grams of tall oil fatty acids obtained under the trade name Acintol FA1, 20 grams of mixed mono-, di- and triisopropanol amines (Dow Chemical commercial product having apparent equivalent weight of about 140) and 400 grams of refined neutral mineral oil having a viscosity of 150 SUS at 100° F. Vigorous agitation is applied, and thick emulsion forms. The emulsion is broken by adding to it 500 cc. of normal hexane. The mixture is allowed to stand, the oil phase, that then separates, is filtered, and the hexane is removed by distillation. The remaining clear dispersion contains 20% barium.

The ashless dispersant concentrate used in this example was prepared by heating 36 pounds of polyisobutylene of about 1000 molecular weight with 4.5 pounds of maleic anhydride for 24 hours at 450° F. to form polyisobutenyl succinic anhydride, adding to the product sufficient light mineral lubricating oil (150 SUS viscosity at 100° F.) to form a 75 weight percent concentrate in oil, adding thereafter 3.5 pounds of tetraethylene pentamine and 1.1 pounds of acetic acid, heating the mixture at 300° F. with nitrogen blowing until water evolution ceased (about 10 hours reaction time) and filtering the product. Nitrogen content of the product concentrate was 1.8 weight percent.

While in the specific examples the hydrocarbon oil that was used was a lubricating oil, it is to be understood that the collodial dispersions may be prepared in any of a wide range of hydrocarbon oils ranging through gasoline fractions, middle distillate fuels, fuel oils, diesel fuels, jet fuels, synthetic hydrocarbon lubricating oils, and any of the various paraffinic, naphthenic, asphaltic or mixed base mineral lubricating oils.

The colloidal dispersions prepared in accordance with this invention may be added to any of several types of hydrocarbons ranging from fuel oils through lubricating oils. Colloidal magnesium carbonate is of particular value for addition to residual fuel oils containing vanadium compounds. The latter are objectionable because the ash tends to be corrosive to metal parts exposed to high temperatures. Magnesium compounds combat this corrosion. For this use sufficient of the colloidal dispersion of $MgCO_3$ can be added to furnish from 0.5 to 4.5 parts of magnesium per part of vanadium. The total amount needed will of course depend on the vanadium content of the fuel oil, which may range anywhere from 5 to 1000 parts per million, for example. Magnesium carbonate sols may also be useful in fuel oils to reduce corrosion caused by sulfur, as by preventing or suppressing sulfur trioxide formation.

For lubricating oil compositions the dispersions prepared by this invention may be added in sufficient quantity to furnish from 0.1 to about 15 weight percent of the carbonate. Other addition agents such an antioxidants, sludge dispersants, viscosity index improvers, pour point depressants, and the like may also be added.

Although lubricants for use in internal combustion engine crankcases are particularly benefited by the invention, transmission lubricants, gear oils, greases, and industrial lubricants are also contemplated. The lubricating oil base stock may be of any desired type mineral lubricating oils derived from the ordinary paraffinic, naphthenic, asphaltic or mixed base crude oils by suitable refining methods, synthetic hydrocarbon lubricants, synthetic ester oils, and the like.

It will be understood that the foregoing examples are merely illustrative of the invention and are not intended to limit its scope.

What is claimed is:
1. A process for preparing a stable colloidal dispersion of an alkaline earth metal carbonate in a liquid hydrocarbon which comprises reacting a concentrated aqueous solution containing at least 20 weight percent of an inorganic acid salt of an alkaline earth metal with a concentrated aqueous solution containing at least 20 weight percent of a carbonate selected from the group consisting of ammonium carbonate and alkali metal carbonates, whereby a gel comprising an aqueous colloidal dispersion of alkaline earth metal carbonate is formed, within 2 minutes thereafter mixing said gel with a liquid hydrocarbon containing an oil-dispersible surfactant whereby an oil-continuous emulsion is formed, and thereafter breaking said emulsion and separating the oil phase from the aqueous phase.

2. Process as defined by claim 1 wherein said aqueous carbonate solution is a solution of sodium carbonate and said solution of alkaline earth metal salt is a solution of calcium chloride.

3. Process as defined by claim 1 wherein said surfactant is a metal petroleum sulfonate.

4. Process as defined by claim 1 wherein said surfactant is the condensation product of an alkenyl succinic anhydride and a polyamine, said alkenyl succinic anhydride having an alkenyl group with a molecular weight within the range of 500 to 3500.

5. Process as defined by claim 1 wherein said surfactant is the condensation product of an alkenyl succinic anhydride, a polyamine and a monocarboxylic acid, said alkenyl succinic anhydride having an alkenyl group with a molecular weight within the range of 500 to 3500.

6. Process as defined by claim 1 wherein an auxiliary polar emulsifier is present during the emulsion formation step.

7. Process as defined by claim 1 wherein an auxiliary polar emulsifier is present in at least one of the reacting aqueous solutions used in forming said gel.

References Cited

UNITED STATES PATENTS

| | | | |
|---|---|---|---|
| 2,568,876 | 9/1951 | White et al. | 252—51.5 |
| 3,185,704 | 5/1965 | Kahn et al. | 252—51.5 |

FOREIGN PATENTS

| | | |
|---|---|---|
| 212,328 | 4/1956 | Australia. |
| 1,254,094 | 1/1961 | France. |
| 1,265,086 | 5/1961 | France. |

DANIEL E. WYMAN, *Primary Examiner.*

P. P. GARVIN, *Assistant Examiner.*